Figure 7:
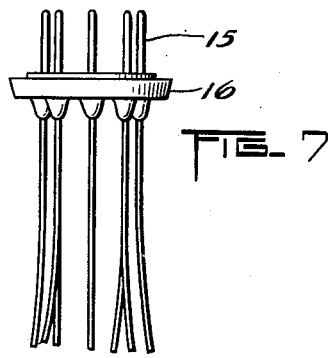

April 20, 1954     H. W. ROEBER     2,675,647
ARTICLE FEEDING DEVICE
Filed Feb. 10, 1949     2 Sheets-Sheet 1

INVENTOR.
Henry W. Roeber
BY
A. L. B. Richardson
Attorney

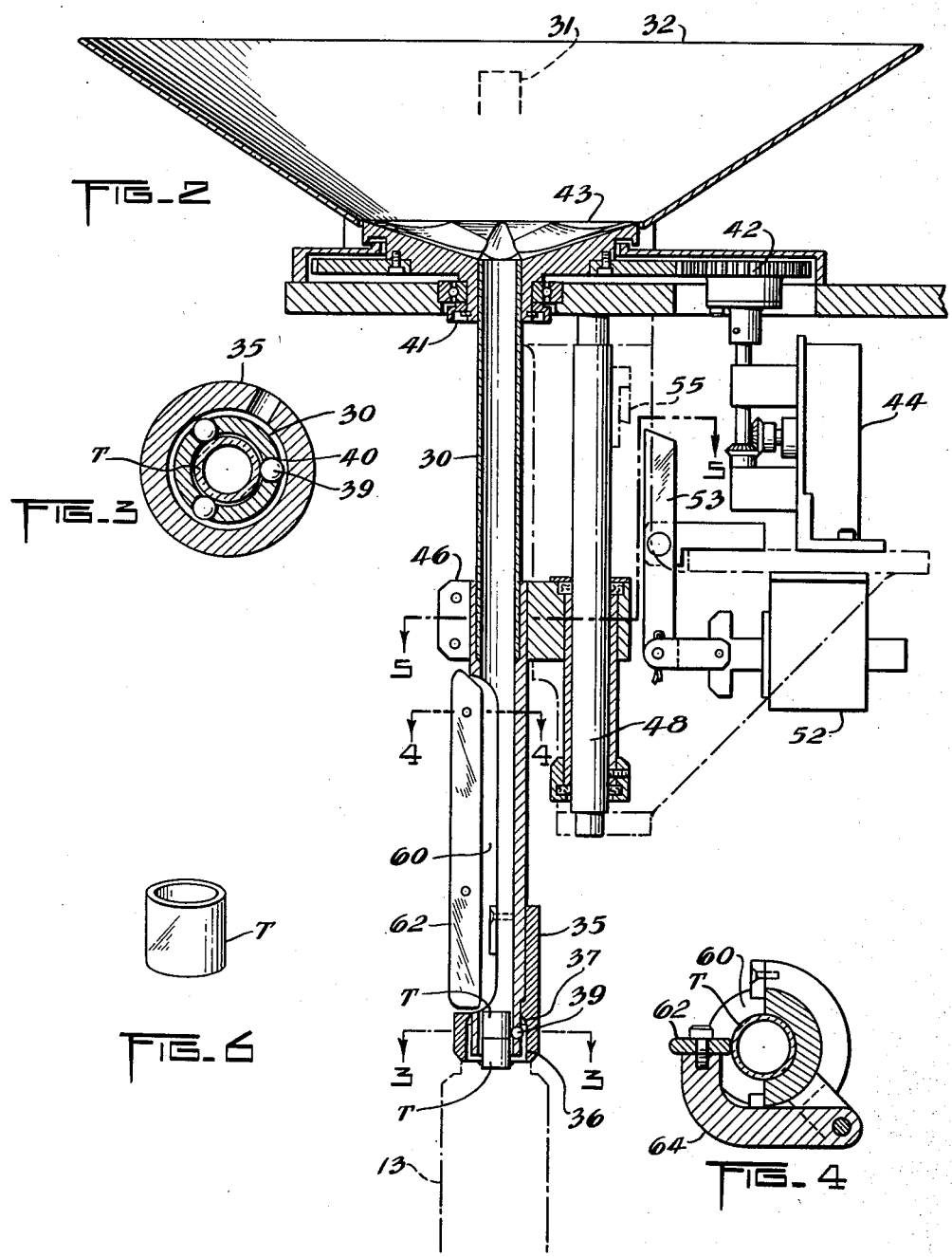

Patented Apr. 20, 1954

2,675,647

UNITED STATES PATENT OFFICE 2,675,647

ARTICLE FEEDING DEVICE

Henry W. Roeber, Emporium, Pa., assignor to Sylvania Electric Products Inc., a corporation of Massachusetts Application February 10, 1949, Serial No. 75,588

5 Claims. (Cl. 49—2)

The present invention relates to article feeding devices and more particularly to a device for axially feeding short tubular glass work pieces from a reservoir to a mold where further work operations are performed on the glass section.

While the device of the present invention is not limited thereto, it is particularly applicable to molding machines of the type disclosed in application No. 725,894 filed February 1, 1947 by the present applicant jointly with S. J. Gartner and W. L. Reiter, said application being assigned to the assignee of the present application.

The machine in said application is particularly adapted to sealing metal leads transversely through a molded glass button to form a header for radio tubes and like devices. The machine includes a turret carrying a plurality of spindles, each spindle including upper and lower mold cavities, both cavities having bores for receiving metal leads which are to be sealed into the molded glass. In the operation of the machine, at least some of the metal leads are placed into the bores in the mold cavities and a short length of glass tubing is set into the lower mold cavity around the metal leads. Thereafter flames are directed toward the glass tubing until it softens sufficiently so that when the upper mold cavity is pressed down against the lower mold cavity the glass tubing is molded into a solid glass button having the leads extending therethrough.

It is an object of the present invention to provide an improved means for placing a short section of glass tubing in the lower mold of said machine in preparation for subsequent molding operations.

It is a further object of the present invention to provide an apparatus for delivering short cylindrical work pieces from a reservoir into a predetermined location in accordance with a cycle of operation which has been established.

A further object of the present invention is the provision of an improved device for handling short sections of glass tubing.

Still another object of the present invention is the provision of a feeding means for delivering short pieces of glass tubing from a reservoir to a predetermined location, in regularly timed sequence of operations.

The foregoing objects, and others which may appear from the following detailed description, are attained by providing a hopper in the shape of an inverted cone for carrying a plurality of work pieces in the form of short sections of glass tubing. An axially movable feed tube is provided, extending through an axial aperture in the hopper. The feed tube is arranged to be vertically reciprocated through the mass of glass sections in the hopper, the diameter of the feed tube being such that the glass sections can fall into the tube only in an aligned end-to-end relationship. The continued reciprocation of the feed tube through the mass of work pieces assures that it is always maintained full as long as there is a sufficient supply of glass sections in the hopper. The lower part of the feed tube carries a sleeve having a ball chuck therein which normally functions to support the stack of glass sections in the tubing. Each downward movement of the tube over a mold causes the sleeve to engage the mold and arrest its movement. Continued downward movement of the feed tube releases the clutch and permits one section of glass tubing to drop into the mold. The upward stroke of the axially movable feed tube causes the clutch to again engage the next glass tubing section whereby only the lowermost glass section remains in the mold.

Figure 1:
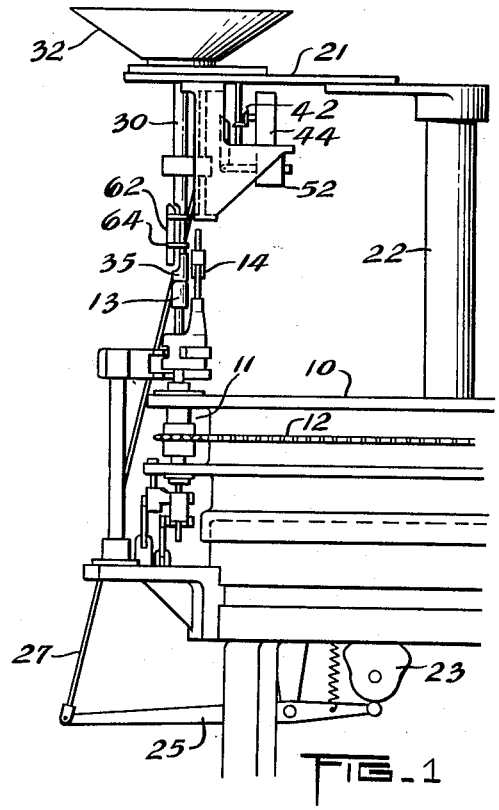
Figure 5:
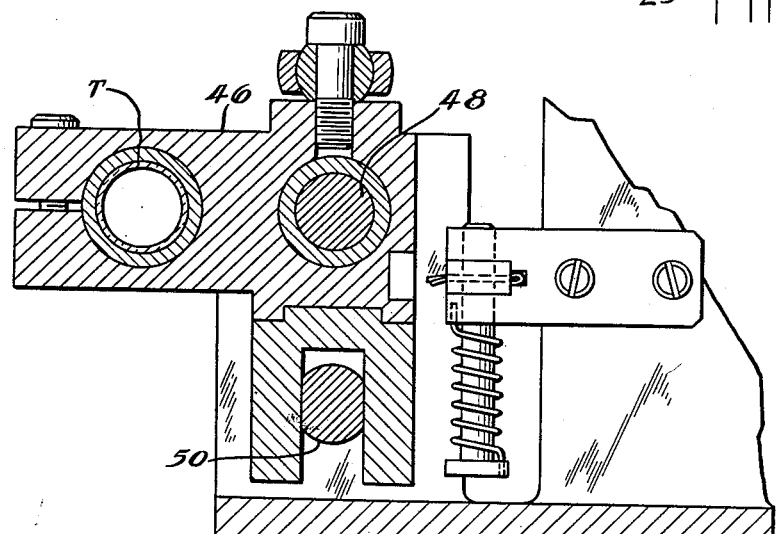

The present invention will be more fully understood by reference to the following detailed description which is accompanied by a drawing, in which Fig. 1 illustrates the application of the feed arrangement of the present invention to a molding machine as described above, while Fig. 2 is an enlarged vertical sectional view of the present invention, Fig. 3 is a transverse section taken along line 3—3 of Fig. 2, Fig. 4 is a transverse section taken along line 4—4 of Fig. 2, while Fig. 5 is a section taken through line 5—5 of Fig. 2, Fig. 6 is a perspective view of one of the work pieces adapted to be fed by the machine of the present invention, while Fig. 7 is a side view of the work piece of Fig. 6 after it has been remolded by the molding machine of Fig. 1.

The machine shown in Fig. 1 includes a rotatable turret 10 carrying around its periphery a number of rotatable spindles 11. While only one of the spindles 11 is shown, it should be understood that as large a number as may be required is arranged, evenly spaced around the periphery of the turret 10. The turret is preferably indexed cyclically about, so that each spindle in turn occupies a number of work stations around the periphery of the turret. In many of the work stations, the spindles 11 are arranged to be driven by a chain 12 independently of the rotation of the turret. In other of the stations, it may be desired to hold the spindles 11 stationary. The details of the construction for performing this function are not shown in this application, since they are of no interest in the present construction. However, reference may be made to the above mentioned prior filed application for further details if desired.

Each of the spindles carries a lower mold 13. There is also associated with each spindle an upper mold 14 which may be shifted into and out of a position axially aligned with the lower mold 13. Molds 13 and 14 are provided with bores to take the wires 15 (Fig. 7), which are to be molded into the glass header button 16. The mold cavities 13 and 14 are properly formed so as to produce the desired conformation of the button 16. At the station where the glass tubing is to be loaded into the lower mold 13, means are provided for swinging upper mold 14 out of the way, so that the loading tube 30 of the feeder structure may seat over the lower mold 13. The feeder is rigidly supported over the desired loading station by supporting arm 21 extending from the central non-rotatable post 22 of the molding machine. Cam 23 of the molding machine rotates once for each stepwise movement of the main turret 10 and, in rotating, through lever arm 25, cam 23 causes one reciprocatory movement of actuating rod 27 as each spindle comes into position under the tubing feeder. Each cycle of movement of rod 27 causes central feed tube 30 (Fig. 2) of the tubing feeder to be reciprocated axially between an upper limit indicated by the dotted line 31 in Fig. 2 and a lower limit wherein the lower end of tube 30 rests against mold 13, of the molding machine as indicated by the dotted lines in Fig. 2. It will be understood that cone-shaped hopper 32 of Fig. 2 contains a large number of work pieces in the form of short cylindrical sections T of glass tubing such as shown in Fig. 6. The upward movement of tube 30 as long as it is not filled with work pieces will engage a number of the work pieces in proper relationship so that they will fall into the tube. The tube is thus maintained full at all times. Around the lower end of tube 30 is provided a chuck sleeve 35 having a counter-bore 36 at its lower end. The counter-bore has a tapered portion 37 at its upper end adapted to press against clutch balls 39 and press them inwardly into engagement with the lowermost work piece. The pressure of balls 39 against work piece T is obtained by the weight of sleeve 35. As tube 30 moves in a downward direction the chuck sleeve 35 eventually comes into contact with the lower mold member 13 and is stopped, while the downward motion of tube 30 continues. This action releases the pressure of the cam surface 37 against the chuck balls 39 and allows the lowermost work piece to drop into the work cavity. As the movement of tube 30 is reversed, the cam surfaces again come into contact with the chuck balls 39 and the chuck balls engage the next work piece T above the one just released.

Fig. 3 of the drawing, being a section taken horizontally through the work piece chuck, shows the concentric arrangement of the work piece, the vertically reciprocating feed tube 30, and the ball chuck jaws 39 maintained in position between the walls of tapered holes 40 and chuck sleeve 35.

The apex 43 of cone-shaped hopper 32 is carried for rotation by bearings 41 and driven by gear train 42 from motor 44. The rotation of the central portion of the hopper together with the continued vertical reciprocation of feed tube 30 maintains the mass of glass work pieces in the hopper in a constant state of agitation such that in each reciprocation tube 30 encounters one or more work pieces in a position to drop into the tube as long as hopper 32 contains a reasonable number of work pieces. Rod 27 is coupled to the feed tube 30 by means of a cross head 46 clamped to the feed tube 30 and guided for vertical reciprocation by guide rods 48 and 50 (Fig. 5). In the event it is desired not to place a work piece on any particular chuck 13 as it arrives at the loading position, solenoid 52 (Fig. 2), may be energized, thus pulling latch member 53 into the path of member 55. The cross head is thus locked against vertical reciprocation and the cam follower end of lever 25 rides free from the surface of cam 23 until the solenoid 52 is again deenergized.

Since there is a possibility that some of the work pieces may be broken, means are provided for removing such pieces from the feed tube 30. This includes an aperture 60 in the feed tube 30 extending over a substantial longitudinal extent of the tube 30. Work pieces are prevented from falling freely out of this aperture by a gate in the form of a longitudinal strip of metal 62 supported by hinge members, one of which is shown in section in Fig. 4, and indicated by reference character 64. By swinging member 62 out of the way, ready access is provided to the interior of feed tube 30 for removing any number of broken pieces.

What is claimed is:

1. An article feeding device including a conical hopper for holding a supply of said articles, a feed tube arranged for vertical reciprocation through the mass of articles whereby said tube is continually maintained full of said articles, chuck means at the lower end of said tube and means for releasing said chuck at the lower end of each reciprocating stroke whereby one of said articles is released and means for actuating said chuck to grasp the next adjacent article at the beginning of upward movement of said tube.

2. A tubing feeding device including a hopper for holding a supply of said short sections of tubing, means for stirring said sections, a feed tube arranged for vertical reciprocation through the mass of sections whereby said tube is continually maintained full of said sections, chuck means at a distance above the lower end of said tube greater than the length of one of said sections for grasping the lowermost of said sections and means for releasing said chuck at the lower end of each reciprocating stroke whereby the grasped one of said sections is released, and means for actuating said chuck to grasp the next adjacent section at the beginning of upward movement of said tube.

3. A work piece feeder adapted to deposit short, cylindrical work pieces into a work holder, including a feed tube, containing a number of said pieces in an end to end arrangement, chuck means on said tube adapted to grip the end one of said pieces, chuck operating means adapted to release said end work piece upon contact with said work holder and means effective to cause said chuck to grip the work piece next to the end one upon movement of said tube away from said work holder.

4. A glass tubing feeder adapted to deposit individual short sections of glass tubing into a work holder, including a feed tube, containing a number of said sections in an end to end arrangement, chuck means on said tube adapted to hold the end one of said sections, chuck operating means adapted to release said end section upon contact with a work holder and means effective to cause said chuck to engage the section next to the end one upon movement of said tube away from said work holder, said chuck including a plurality of radially movable pieces extending through the wall of said feed tube to bear on the sides of said sections and an axially movable sleeve about the lower end of said tube, said sleeve having a cam surface on its interior, adapted to move said radially movable pieces inward as the end of said sleeve is moved beyond the end of said feed tube the weight of said sleeve serving to hold the lowermost of said section.

5. A work piece feeder adapted to deposit work pieces into a work holder, including a feed tube, containing a number of said pieces in an end to end arrangement, chuck means on said tube adapted to hold the end one of said pieces, chuck operating means adapted to release said end work piece upon contact with said work holder and means effective to cause said chuck to engage the work piece next to the end one upon movement of said tube away from said work holder, said chuck including a plurality of radially movable pieces extending through the wall of said feed tube and an axially movable sleeve about the lower end of said tube, said sleeve having a cam surface on its interior, adapted to move said radially movable pieces inward as the end of said sleeve is moved beyond the end of said feed tube, said radially movable pieces being located a distance from the end of said tube greater than the length of one work piece.

References Cited in the file of this patent

UNITED STATES PATENTS

| Number | Name | Date |
|---|---|---|
| 590,635 | Sturtevant | Sept. 28, 1897 |
| 620,350 | McGrail | Feb. 28, 1899 |
| 734,734 | McBerty et al. | July 28, 1903 |
| 866,347 | Fagan | Sept. 17, 1907 |
| 959,930 | Graybill | May 31, 1910 |
| 1,437,431 | Lonbom et al. | Dec. 5, 1922 |
| 1,492,602 | Leveridge et al. | May 6, 1924 |
| 1,536,833 | Fagan et al. | May 5, 1925 |
| 2,311,251 | Rees et al. | Feb. 16, 1943 |

FOREIGN PATENTS

| Number | Country | Date |
|---|---|---|
| 10,224 | Great Britain | Apr. 25, 1914 |